United States Patent [19]
Fischer

[11] 3,898,907
[45] Aug. 12, 1975

[54] EXPANSION ANCHOR

[76] Inventor: Artur Fischer, Altheimer Strasse 219, D-7241 Tumlingen, Germany

[22] Filed: Apr. 13, 1973

[21] Appl. No.: 350,892

[30] Foreign Application Priority Data
Apr. 26, 1972 Germany............................ 2220422

[52] U.S. Cl. ......................................... 85/64; 85/73
[51] Int. Cl.² ......................................... F16B 13/06
[58] Field of Search ...................... 85/64, 32 CS, 73

[56] References Cited
UNITED STATES PATENTS

| | | | |
|---|---|---|---|
| 254,559 | 3/1882 | Lothrop ............................ | 85/32 CS |
| 768,283 | 8/1904 | Jenkins ................................... | 85/64 |
| 2,439,685 | 4/1948 | Findley ............................... | 85/32 S |

FOREIGN PATENTS OR APPLICATIONS

| | | | |
|---|---|---|---|
| 2,058,219 | 6/1971 | Germany ................................ | 85/64 |
| 1,022,013 | 3/1966 | United Kingdom..................... | 85/64 |

*Primary Examiner*—Edward C. Allen
*Attorney, Agent, or Firm*—Michael S. Striker

[57] ABSTRACT

An expansion sleeve for insertion into a hole of a support structure is configurated as a helical wire spring whose adjacent convolutions abut one another. In a portion of the spring which extends from the trailing towards the leading end thereof, the abutting convolutions are connected with one another by soldering, bonding, welding, or the like, so as to be immovable relative to one another. An expander element is located at the leading end and an actuator screw extends from the trailing end through the spring to the leading end where it engages the expander element so as to draw the same into the screw towards the trailing end.

5 Claims, 2 Drawing Figures

EXPANSION ANCHOR

BACKGROUND OF THE INVENTION

The present invention relates to an expansion anchor in general, and in particular to an expansion anchor which is especially suited for use in cementitious support structures, such as concrete.

The anchoring of expansion anchors in cementitious support structures, particularly those of concrete, presents certain problems which are not encountered with support structures of other materials. In particular, the inherent structure of concrete (cement plus aggregate) makes it difficult if not impossible to drill a hole for the expansion anchor which is entirely cylindrical and wherein all points of the inner surface bounding the hole are radially equidistant from the axis of the hole. Since conventional expansion anchors were found under these circumstances to be less than satisfactory, an improved expansion anchor was developed in the prior art and utilizes as its expansion sleeve a helical wire spring. When such a spring is inserted into the bore hole it will readily accommodate itself to the cross-sectional configuration of the hole despite the aforementioned inaccuracies in this cross-sectional configuration. This means that even before the expander member is drawn into the spring to expand it, the spring is already frictionally retained in the hole by a force sufficient to prevent it from turning during the subsequent drawing-in of the expander member. Moreover, the spring convolutions surrounding the expander member engage the same tightly enough so that the expander member itself will not turn as it is being drawn into the spring for expanding the latter, which is usually accomplished by turning a screw which is accessible at the exterior of the spring and of the bore hole and is connected with the expander member.

This construction has the advantage that the spring constituting the expansion sleeve distributes the outwardly directed expansion force of the expansion member over its entire length located within the bore hole. This prevents a "kerfing" or incising action into the material surrounding the bore hole and thus reduces the danger that the material might become sufficiently loosened about the bore hole to cease offering engagement to the spring, resulting in destruction of the anchoring effect. Moreover, the sleeve can of course be produced very inexpensively because it is merely necessary to form a wire spring so that any further operations, such as the formation of slots to permit expansion, are eliminated.

However, this prior-art construction does have one significant disadvantage; namely tests have shown that it is necessary that the trailing end of the spring be engaged by a cap, part of which extends into the spring to support the convolutions at the trailing end thereof, and another part of which overlies the trailing end face of the spring. The use of such a cap not only increases the expense of producing the expansion anchor, because it involves a separate manufacturing step and requires additional raw material, but also makes the actual employment of the expansion anchor more difficult than would otherwise be the case.

SUMMARY OF THE INVENTION

It is, accordingly, a general object of the invention to overcome the disadvantages just outlined.

More particularly, it is an object of the present invention to provide an improved expansion anchor, particularly suitable for use in cementitious support structures such as concrete, which avoids these disadvantages.

Still more particularly it is an object of the invention to provide such an improved expansion anchor utilizing a helical spring as its expansion anchor sleeve, but not requiring the use of the cap mentioned above.

In keeping with these objects, and with others which will become apparent hereafter, one feature of the invention resides in an expansion anchor comprising an expansion anchor sleeve adapted to be inserted into a hole of the support structure. The sleeve has a leading end, a trailing end and is constituted as a helical wire spring whose adjacent convolutions abut one another and which has a portion extending from the trailing end towards the leading end wherein the convolutions are connected and immovable relative to each other. An expander element is adapted to be drawn into the leading end in direction towards the trailing end, and an actuating element is provided for drawing the expander element into the sleeve.

Thus, the convolutions at the trailing end of the sleeve are connected with one another so that they cannot perform any movements relative to one another. This means that in this portion of the sleeve where the convolutions are so connected the sleeve is stiff, and this portion serves to protect the movable convolutions located towards the leading end of the sleeve from lateral displacement and the like. In other words, the trailing portion of the sleeve acts as a guide during the insertion of the sleeve into the expansion anchor hole as well as in the hole of an object which is to be fastened to the structure in which the expansion anchor hole is produced. With reference to this latter possibility it has been found that the separate guide sleeve, which is usually used in the hole of a structure to be fastened to a support, may be omitted.

The connection between the convolutions of the portion in question can be effected in various ways. Convolutions can be soldered together, particularly by hard soldering. It is possible but not necessary that the convolutions are connected with one another over the entire circumference of the spring sleeve. Rather, they can be connected at spaced dot-shaped or strip-shaped locations.

It can, however, also be sufficient to connect the convolutions by pressing them together. To do this, a tool is inserted into the interior of the spring and a radially inwardly acting outer tool engages the spring and presses the convolutions against the inner tool. This results in the formation of projections on the thus-engaged and pressed convolutions which projections constitute an abutment for the respective adjacent convolution from which the latter cannot be laterally displaced. Of course, the convolutions can also be welded together, particularly by spot welding.

A further possibility is to provide at least one narrow thin strip of sheet metal which is inserted into the interior of the spring and is connected by spot welding with the convolutions of the latter. This strip is not disadvantageous because it does not interfere with the screw or bolt extending through the spring and serving to engage the expander element. There is sufficient clearance to avoid such interference. If this particular arrangement is utilized, then it has been found to be especially advantageous if the strip of sheet metal is provided with an annular bead or flange which overlies the axial end face of the spring at the trailing end of the latter, thus assuring that if necessary this axial end face can abut directly against the nut threaded onto the rear end of the screw extending through the sleeve, without having to use a separate washer. In other words, the flange replaces the washer and serves the same functions as the washer, preventing in particular the possibility that during turning of the nut the convolutions of the spring might be so deformed by engagement of the turning nut as to unwind the spring.

The novel features which are considered characteristic for the invention are set forth in particular in the appended claims. The invention itself, however, both as to its construction and its method of operation, together with additional objects and advantages thereof, will best be understood from the following description of specific embodiments when read in connection with the accompanying drawing.

DESCRIPTION OF THE PREFERRED EMBODIMENTS

Figure 1:
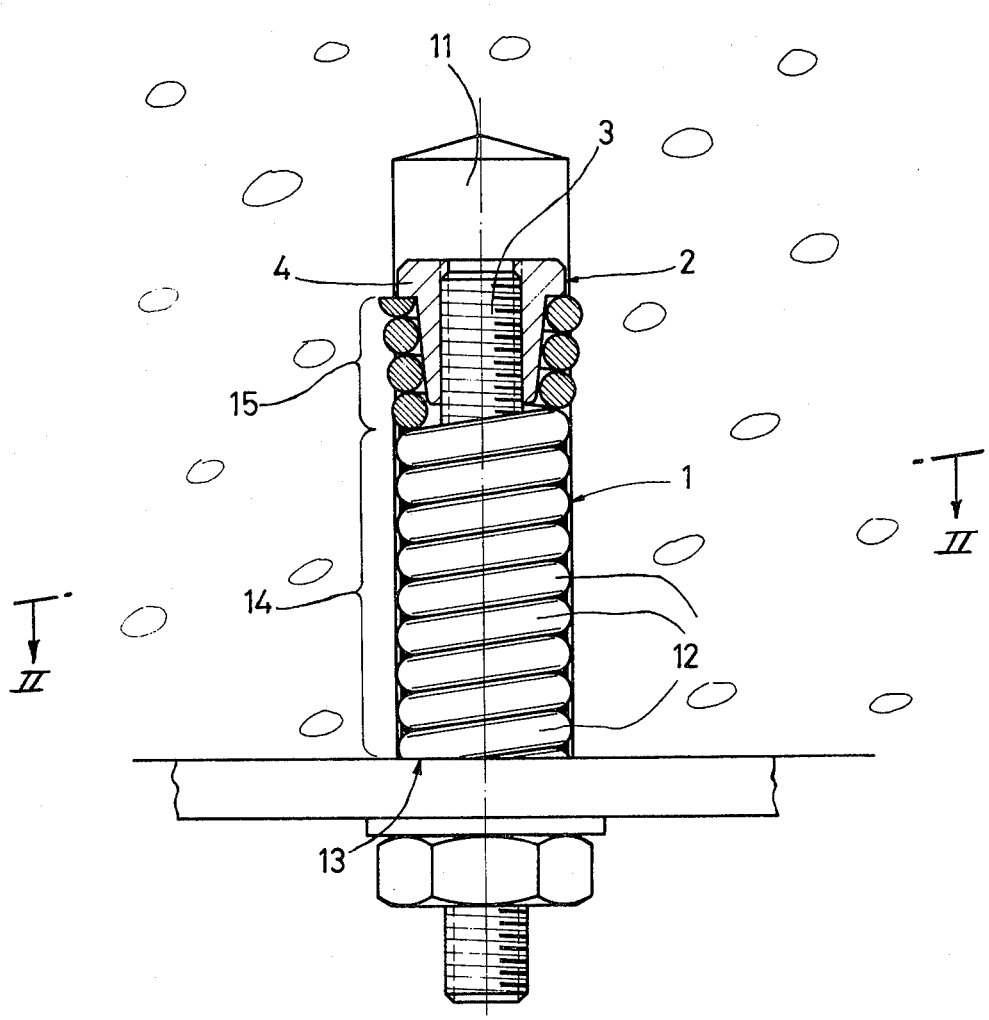
FIG. 1 is a fragmentary section showing an expansion anchor according to the present invention installed in a bore hole.
Figure 2:
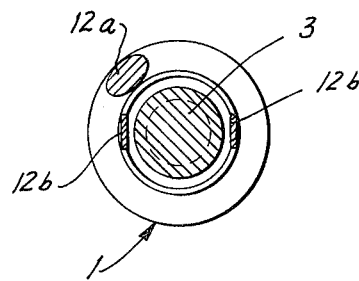
FIG. 2 is an axial section through FIG. 1 taken on line II—II thereof, but showing a somewhat different embodiment.

Discussing the drawing now in detail it will be seen that FIGS. 1 and 2 illustrate exemplary embodiments of the invention. The expansion anchor shown therein utilizes an expansion anchor sleeve in form of a helically wound wire spring 1, the adjacent convolutions of which abut one another. At the leading end of the spring 1 there is provided an expander element 2, and a screw 3 extends from the trailing end through the spring 1 to the expander element 2, which it engages so that as the screw is turned in requisite sense the conical expander element 2 is drawn into the leading end of the spring 1 towards the trailing end, thereby expanding the spring. It is shown that as this takes place, the convolutions of the spring in the region of the leading end are expanded and pressed against the inner surface 11 bounding the bore hole.

In addition, the expander element 2 is provided with a shoulder 4, the outer diameter of which corresponds to the inner diameter of the bore hole 11.

In the region of the spring 1 which is identified with reference numeral 14 and extends from the trailing end 13 towards the leading end but short of the same, the abutting convolutions 12 are connected to one another so that they cannot move relative to each other. Connecting means is diagrammatically illustrated at 12a and may be in form of solder joints, in form of welds including spot welds, in form of adhesive matter or by press-forming the earlier-mentioned projections. Thus, in the region 14, the spring is stiff and this region serves as a guide which guides the spring during the insertion into the bore hole without having to provide the aforementioned sleeve required in the prior art. Of course, once the spring is inserted, the expander element 2 is drawn into it, whereby the convolutions of the leading section or portion 15 are radially expanded to anchor the spring in the bore hole. The embodiment of FIG. 2 is identical to that of FIG. 1, except that it has two longitudinally extending internal strips 12b which extend in the region 14 and are rigidly connected with the spring convolutions 12 of the trailing end 14. These strips 12b may be provided instead of, or in addition to, the connecting means 12a.

It will be understood that each of the elements described above, or two or more together, may also find a useful application in other types of constructions differing from the types described above.

While the invention has been illustrated and described as embodied in an expansion anchor, it is not intended to be limited to the details shown, since various modifications and structural changes may be made without departing in any way from the spirit or basic concept of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of the invention and, therefore, such modifications and adaptations should and are intended to be comprehended within the meaning and range of equivalence of the following claims.

What is claimed as new and desired to be protected by Letters Patent is set forth in the appended claims.

1. An expansion anchor, particularly for use in a concrete support structure having an exposed surface and provided with a hole having an open end in the region of the exposed surface and extending beyond the same and into the support structure, comprising a partly expandable tubular element consisting of a helical wire spring having adjacent convolutions, and extending from one end of said partly expandable element to the other end thereof, said helical wire spring having a leading end portion and a trailing end portion and being adapted to be inserted into the hole of the support structure so that said leading end portion is remote from, and said trailing end portion is closer to, the open end of the hole; means for permanently interconnecting only the convolutions of said trailing end portion so as to prevent these convolutions from conducting any movement with respect to one another radially and circumferentially of said spring; an expander element adapted to be inserted into said leading end portion; and an actuating element for drawing said expander element into said leading end portion and in direction toward said trailing end portion, whereby said expander element exerts expansion forces on all convolutions of said spring so that the convolutions of said leading end portion expand and anchor said leading end portion in the hole, while the convolutions of said trailing end portion are prevented from expanding by said interconnecting means so that the support structure in the region of the hole adjacent the open end of the latter is unaffected by the expansion whereby damage to said support structure in said region is avoided.

2. An expansion anchor as defined in claim 1, wherein said interconnecting means includes solder.

3. An expansion anchor as defined in claim 1, wherein said interconnecting means includes adhesive.

4. An expansion anchor as defined in claim 1, wherein said interconnecting means includes welded joints.

5. An expansion anchor as defined in claim 1, said interconnecting means comprising a metallic strip located within said spring and extending longitudinally thereof, said strip being welded to said convolutions of said trailing end portion.

* * * * *